UNITED STATES PATENT OFFICE 2,586,092

EMULSION COPOLYMERIZATION OF STYRENE WITH BODIED OIL OR BODIED OIL MODIFIED ALKYD

Ralph Sidney Robinson, Liverpool, England, assignor to Reichhold Chemicals, Inc., Detroit, Mich.

No Drawing. Application November 1, 1948, Serial No. 57,830. In Great Britain October 22, 1947

12 Claims. (Cl. 260—8)

This invention relates to the manufacture of emulsions and surface coatings produced therefrom.

It is known that emulsions of polymers can be made by polymerising vinyl compounds for example styrene in aqueous suspension, also that emulsions of co-polymers for example those derived from styrene and butadiene can be made in like manner. It has also been proposed that these emulsions may be employed inter alia in the production of films such as in surface coating, and adhesion. These films, however, lack the property of polymerising further during or after drying by the loss of water as do films obtained from fatty drying oils so widely used because of this property in the production of paints and varnishes.

It is an object of the invention to manufacture emulsions of co-polymers derived from certain "bodied" fatty oils, or oleo-resinous varnishes containing the same, and styrene, from which films can be obtained which can dry by the combination of loss of water and oxidation, or which after or during drying by the removal of water may be further polymerised by heat and/or light.

Accordingly, the present invention provides a process for the manufacture of emulsions wherein a "bodied" linseed oil or a "bodied" dehydrated castor oil or an alkyd resin modified with either or both of these oils or an oleoresinous varnish containing either or both of these oils together with styrene are suspended in an aqueous medium and subjected to co-polymerisation by means of heat and/or light in the presence or absence of a polymerisation catalyst.

The present invention also includes water paints based upon the emulsions made as hereinbefore and hereinafter described, by the addition of driers, pigments, extenders, resins and/or additional oils either after or during the preparation of the said emulsions. Varnishes and lacquers may also be prepared in a similar manner by omitting the pigments.

Dispersing agents, stabilisers, modifying agents and/or driers may be present during the co-polymerisation or may be added subsequently.

Catalysts which may be employed are those commonly known and used in emulsion polymerisation technique, the most important being peroxides and salts of per-acids such as ammonium persulphate, sodium perborate and hydrogen peroxide.

The preferred concentration of catalyst is from 0.1 to 5.0% by weight calculated on the total reaction mixture.

Incorporation of known controlling agents during the preparation of the emulsions is, of course, possible in addition to the catalyst. If the controlling agent used is of the accelerative type, the smaller proportions of catalysts will suffice. If, however, it is of the retarding type, then a larger proportion of catalyst is necessary according to the amount of controlling agent added.

In many cases the emulsion polymerisation systems can be maintained at the temperature of the preparation for quite long periods after reaching what is considered to be the satisfactory state without undue further changes taking place. In other cases, however, depending on the reactive nature of the oil or varnish used, the proportion and type of catalyst employed, the styrene to oil ratio, and the pH of the system, the reaction has to be stopped immediately the emulsion has acquired the desired characteristics such as viscosity or extent to which the styrene has reacted. Reagents capable of stopping emulsion polymerisation reactions are well known, and are commonly used in the preparation of synthetic rubbers such as those of the butadiene/styrene and butadiene/acrylonitrile types. These are usually phenolic or aromatic amino compounds.

The inclusion of rosin during the preparation of the emulsions has been found to improve the gloss of paint films derived therefrom.

Continuous agitation during the polymerisation process is desirable otherwise skin formation occurs. The agitation however, should be sufficient only to prevent this skin formation, and to keep the mass in an emulsified state. Excessive stirring is undesirable, as this appears to have an inhibiting effect on the co-polymerisation.

It is advisable in preparing the emulsions to incorporate a dispersing agent such as a soluble soap, for example sodium oleate, a soluble salt of a sulphonic acid, for example sodium dinaphthylmethane sulphonate, or a soluble salt of an alkyl sulphate, for example a sodium salt of a mixture of sulphated olefines, or the sodium salt of sulphated castor oil. The use of a dispersing agent greatly assists in the initial emulsification of the reactants and also in the dispersion of pigments when making water paints from the emulsions.

It is also advisable to have present during the copolymerisation or to add to the emulsion after the copolymerisation, a stabiliser such as ammonium caseinate, dextrine or gelatine, ammonium caseinate being the preferred stabiliser.

Although it is possible to prepare the co-polymer emulsions of the present invention at a pH value of 5 or over, it is preferred to keep the pH of the system above 7.5. At pH values below this there is a strong tendency towards gelation of the oil/styrene phase, and the emulsions themselves are frequently rather unstable.

The use of sodium and potassium alkalies, although possible for solubilising the casein and obtaining the deired pH value, are generally undesirable on account of their detrimental effect on the film properties, especially water resistance.

I prefer to prepare the emulsions with a water content of between 50 and 75% by weight and with a proportion of fatty oil in the co-polymer of between 50 and 95% by weight.

Preferably the co-polymerisation is effected at a temperature of between 55° C. and 65° C.

The preparation of water paints from the present invention can be carried out by mixing the pigment and paint drier into the emulsion and diluting with water if necessary. Alternatively a pigment paste may first be prepared by mixing the pigment with water which may contain a wetting agent such as a sulphated fatty alcohol and/or a stabiliser such as glue, casein or a natural water-soluble gum. This pigment paste can then be added to the emulsion, or vice versa, as required.

The pigmentation of the water paints can be effected using any of the known types of machinery, e. g. mixers of the Werner-Pfleiderer type, and mills of the edge-runner, triple-roll, cone, or ball types. The preparation of the paints may be carried out either hot or cold.

If desired any of the compounding ingredients may be incorporated during the preparation of the polymer emulsions, thus the paint driers and/or the pigments can be introduced into the initial reaction mixture, prior to the co-polymerisation process.

Organic solvents may be incorporated in the emulsions if desired.

The following examples illustrate how the process of the invention may be carried into effect:

1. 77 gms. of casein were dispersed in 740 gms. of water containing 20 gms. of a sodium alkyl sulphate ("Teepol X" made by Messrs. Shell Chemicals, Ltd., the word "Teepol" being a registered trade-mark). This was effected in a flask fitted with a mechanical stirrer. 50 gms. of aqueous ammonia (sp. gr. 0.90) were added and the whole heated to 60° C. At this temperature the casein dissolved and 4 gms. of ammonium persulphate were then added followed immediately by a mixture comprising 500 gms. of dehydrated castor oil of 15–20 poises viscosity (at 25° C.), 20 gms. of gum rosin, and 250 gms. of styrene. It was then maintained at the temperature of 60° C. under a reflux condenser for 30 hours with stirring. The emulsion was then of a very viscous nature and was found to contain very little free styrene.

A water paint was made in the conventional manner from this emulsion by mixing 200 gms. thereof with 56 gms. of pure titanium dioxide, 60 gms. of water and naphthenate driers corresponding to 0.5% of lead, 0.025% of cobalt and 0.025% of manganese (calculated on the weight of dry co-polymer), this mixture then being passed over a three-roll mill. Films brushed out from this paint became "touch-dry" in approximately 1 hour and after standing overnight were quite tack-free and would then withstand severe washing with water. The dry films possessed extremely good white colour, and a good uniform egg-shell gloss.

2. 60 gms. of casein were dispersed in 900 gms. of water containing 16 gms. of a sodium alkyl sulphate ("Teepol-X" made by Messrs. Shell Chemicals, Ltd., the word ("Teepol" being a registered trade-mark). This was effected in a flask fitted with a mechanical stirrer. 40 gms. of aqueous ammonia (sp. gr. 0.90) were added and the whole heated to 60° C. At this temperature the casein had dissolved and 20 gms. of ammonium persulphate were then added followed immediately by a mixed solution comprising 368 gms. of dehydrated castor oil (viscosity 100-130 poises at 25° C.), 64 gms. of American gum rosin and 184 gms. of styrene. The whole was then maintained at a temperature of 60° C. under a reflux condenser for 20 hours with moderately slow stirring. The emulsion produced was of a very viscous nature and contained very little free styrene.

A water paint was made by mixing together 20 gms. of this emulsion, 40 gms. of pure titanium dioxide pigment, 20 gms. of water, and metallic naphthenate driers corresponding to 0.5% of lead and 0.03% of cobalt (calculated on the weight of the dry co-polymer), and then passing this mixture over a triple-roll paint mill. After further diluting this paint with water, films were brushed out and these became "touch-dry" in approximately one hour and after standing overnight were quite tack-free, and would withstand washing. The dry films possessed excellent white colour and a good uniform gloss.

3. An emulsion was prepared by a process exactly similar to that described in Example 2 but using the following ingredient formula:

| | Gms. |
|---|---|
| Water | 900 |
| "Teepol-X" | 16 |
| Casein | 60 |
| Aqueous ammonia | 40 |
| Ammonium persulphate | 8 |
| 110 poise linseed stand oil | 400 |
| American gum rosin | 16 |
| Styrene | 200 |

A water paint was then made by mixing 100 gms. of this emulsion with 200 gms. of lithopone, 5 gms. of yellow hydrated iron oxide, 60 gms. of water and metallic naphthenate driers corresponding to 0.5% of lead and 0.03% of cobalt (calculated on the weight of dry co-polymer), and this mixture then ground on a cone mill. The resulting water paint gave satisfactory matt films on wood, plaster, brick and asbestos board.

4. 82 gms. of pure titanium dioxide pigment and 16 gms. of casein were thoroughly dispersed in 300 gms. of water containing 6 gms. of "Teepol-X." 11 gms. of concentrated aqueous ammonia (sp. gr. 0.90) were added and the solution was heated to 60° C. at which point 5 gms. of ammonium persulphate were added followed immediately by a mixed solution comprising 98 gms. of 100–130 poise grade dehydrated castor oil, 16 gms. of American gum rosin and 49 gms. of styrene. The temperature of 60° C, was then maintained for 20 hours in a flask fitted with a reflux condenser, the contents being stirred throughout. The resultant water paint was then cooled and was found to have a non-volatile content of 44%.

5. A pigment/oil paste was first made up as follows: 400 gms. of titanium dioxide pigment, 400 gms. of dehydrated castor oil (15–20 poise grade), 6 gms. of cobalt naphthenate (containing 6% by weight of cobalt), and 65 gms. of American gum rosin were mixed together with warming to effect good dispersion of the pigment and solution of the rosin. This mixture was then passed over a triple-roll paint mill.

400 gms. of water, 6 gms. of "Teepol-X," 20 gms. of casein, 15 gms. of concentrated aqueous ammonia (sp. gr. 0.90) and 7 gms. of ammonium persulphate were then stirred together in a flask and warmed to 60° C. at which point, whilst still stirring, a mixture of 320 gms. of the pigment/oil paste made as described above, with 80 gms. of styrene were slowly added. Agitation was then continued and the temperature of 60° C. maintained for 20 hours, at the end of which the product on cooling was a white water paint having a non-volatile content of approximately 50%.

In the following Examples 6 to 8, emulsions were made from which it was found possible to make water paints by employing the following ingredient formulae, using the same procedure (except where otherwise stated) as that of Example 2.

|  | Gms. |
|---|---|
| 6. Water | 900 |
| "Teepol-X" | 16 |
| Casein | 60 |
| Concentrated ammonia | 40 |
| Ammonium persulphate | 13 |
| 100–130 poise dehydrated castor oil | 276 |
| American gum rosin | 64 |
| Styrene | 276 |

|  | Gms. |
|---|---|
| 7. Water | 900 |
| "Teepol-X" | 16 |
| Casein | 60 |
| Concentrated ammonia | 40 |
| Ammonium persulphate | 8 |
| Alkyd resin (see below) | 400 |
| American gum rosin | 16 |
| Styrene | 200 |

The alkyd resin used was of the oil-modified type and was prepared by heating together 100 parts by weight of phthalic anhydride, 50 parts by weight of glycerol and 250 parts by weight of bodied dehydrated castor oil. Heating was carried out at 250° C. under an atmosphere of carbon dioxide until the acid value had fallen to 8 at which it was then allowed to cool.

|  | Gms. |
|---|---|
| 8. Water | 900 |
| "Teepol-X" | 16 |
| Casein | 60 |
| Concentrated ammonia | 40 |
| Ammonium persulphate | 8 |
| Oleo-resinous varnish (see below) | 410 |
| Styrene | 205 |

The oleo-resinous varnish used in this example was prepared by heating together at 270° C. for 8 hours, 100 parts by weight of dehydrated castor oil ("15–20 Poise Synourin" manufactured by Messrs. Novadel, Ltd.) and 50 parts by weight of the pentaerythritol ester of American gum rosin.

The following experiments illustrate the advantages of the present invention:

*Formula employed*

|  | Gms. |
|---|---|
| (A) Water | 1000 |
| (B) "Teepol-X" | 15 |
| (C) Casein | 60 |
| (D) Ammonia (sp. gr. 0.90) | 30 |
| (E) Ammonium persulphate | 8 |
| (F) Oil | 400 |
| (G) Styrene | 200 |

*Procedure*

(A) and (B) were mixed together in a 2-litre flask fitted with a mechanical stirrer. (C) was then dispersed in this solution and (D) was then added. The temperature was subsequently increased to 60° C. at which point (E) was added, followed immediately by (F) and (G) (previously mixed together). The whole was then maintained at a temperature of 60° C. under a reflux condenser for 20 hours with moderately slow stirring. At the end of this time it was cooled and transferred from the flask to a stoppered container.

The properties of the emulsions obtained were as follows:

| Oil used | Appearance of emulsion | Non-volatile content, per cent |
|---|---|---|
| Linseed oil | Very thin, split on standing | 29.1 |
| Tung oil | do | 29.7 |
| Oiticica oil ("Cicoil") | do | 29.3 |
| Soya bean oil | do | 28.4 |
| Stillingia oil | do | 28.2 |
| Isomerised linseed oil, ("Conlinol") | do | 34.4 |
| 15–20 Poise linseed stand oil | Moderately thin, pale, fairly homogeneous | 35.4 |
| 100-Poise linseed stand oil | Fairly viscous, very pale and homogeneous | 38.2 |
| 100-Poise blown linseed oil | Fairly viscous, light brown, homogeneous | 37.0 |
| 3-Poise dehydrated castor oil | Fairly thin, very pale and homogeneous | 34.4 |
| 15–20 Poise dehydrated castor oil | Slightly viscous, very pale and homogeneous | 37.0 |
| 100-Poise dehydrated castor oil | Fairly viscous, very pale and homogeneous | 37.3 |

In the formulation used the theoretical non-volatile content assuming no styrene conversion is approximately 27% whereas that assuming full conversion is approximately 38%.

The pH values of the emulsions were roughly the same in all cases, i. e. 9.0–9.5.

"Cicoil" is processed and sold by Messrs. The Brazil Oiticica Oil Co. Ltd.

"Conlinol" is prepared and sold by Messrs. British Oil and Cake Mills, Ltd.

I claim:

1. A process for the manufacture of emulsions which comprises suspending a bodied oil selected from the group consisting of bodied linseed oil and bodied dehydrated castor oil and styrene in an aqueous medium and subjecting the said substances to co-polymerisation at a temperature of 55° to 65° C.

2. A process for the manufacture of emulsions which comprises suspending a glycerol phthalate alkyd resin modified by a bodied oil selected from the group consisting of bodied linseed oil and bodied dehydrated castor oil and styrene in an aqueous medium and subjecting the said substances to co-polymerisation at a temperature of 55° to 65° C.

3. A process as set forth in claim 2 wherein the bodied oil is bodied dehydrated castor oil.

4. A process for the manufacture of emulsions which comprises suspending an oleo-resinous varnish containing a bodied oil selected from the group consisting of bodied linseed oil and bodied dehydrated castor oil and styrene in an aqueous medium and subjecting the said substances to co-polymerisation at a temperature of 55° to 65° C.

5. A process for the manufacture of emulsions which comprises suspending a bodied oil selected from the group consisting of bodied linseed oil and bodied dehydrated castor oil and styrene in an aqueous medium and subjecting the said substances to copolymerisation in the presence of a polymerisation catalyst at a temperature of 55° to 65° C.

6. A process for the manufacture of emulsions which comprises suspending a bodied oil selected from the group consisting of bodied linseed oil and bodied dehydrated castor oil and styrene in an aqueous medium and subjecting the said substances to co-polymerisation in the presence of an emulsion stabiliser at a temperature of 55° to 65° C.

7. A process for the manufacture of emulsions which comprises suspending a bodied oil selected from the group consisting of bodied linseed oil and bodied dehydrated castor oil and styrene in an aqueous medium and subjecting the said substances to co-polymerisation at a temperature of 55° to 65° C. in the presence of ammonium caseinate as a stabiliser.

8. A process for the manufacture of emulsions which comprises suspending bodied dehydrated castor oil and styrene in an aqueous medium in the presence of ammonium caseinate as a stabilising agent and a polymerisation catalyst and heating the suspension to a temperature of between 55° C. and 65° C. to effect co-polymerisation of the dehydrated castor oil and the styrene.

9. A process for the manufacture of water paints which comprises suspending a bodied oil selected from the group consisting of bodied linseed oil and bodied dehydrated castor oil, styrene, a drier and a pigment in an aqueous medium and subjecting the bodied oil and the styrene to co-polymerisation at a temperature of 55° to 65° C.

10. A process for the manufacture of water paints which comprises suspending a bodied oil selected from the group consisting of bodied linseed oil and bodied dehydrated castor oil and styrene in an aqueous medium, subjecting the said substances to co-polymerisation at a temperature of 55° to 65° C. and adding to the emulsion thus produced a drier and a pigment.

11. A process for the manufacture of emulsions which comprises suspending (1) a glycerol phthalate alkyd resin modified by bodied dehydrated castor oil and (2) styrene in an aqueous medium containing casein, sodium, alkyl sulphate, ammonia, ammonium persulphate and rosin; stirring the mixture and subjecting the same to a temperature of 55° to 65° C. to effect copolymerisation of the modified alkyd resin and the styrene, and adding to the emulsion thus produced a drier and a pigment.

12. A process which comprises suspending (1) a member of a group consisting of (a) a bodied oil selected from a group consisting of bodied linseed oil and bodied dehydrated castor oil, and (b) a glycerol phthalate alkyd resin modified by such bodied oil, and (2) styrene in an aqueous medium, and subjecting said substances to co-polymerisation at a temperature of 55° to 65° C.

RALPH SIDNEY ROBINSON.

REFERENCES CITED

The following references are of record in the file of this patent:

UNITED STATES PATENTS

| Number | Name | Date |
|---|---|---|
| 1,836,021 | Gibbons | Dec. 15, 1931 |
| 2,276,176 | Flint et al. | Mar. 10, 1942 |
| 2,322,837 | Ellis | June 29, 1943 |
| 2,343,091 | Smith | Feb. 29, 1944 |
| 2,343,095 | Smith | Feb. 29, 1944 |
| 2,392,710 | Wakeford et al. | Jan. 8, 1946 |
| 2,402,331 | Kvalnes | June 18, 1946 |
| 2,443,735 | Kropa | June 22, 1948 |
| 2,473,801 | Kropa | June 21, 1949 |

FOREIGN PATENTS

| Number | Country | Date |
|---|---|---|
| 469,319 | Great Britain | July 19, 1937 |